(12) United States Patent
Yuk et al.

(10) Patent No.: US 7,924,145 B2
(45) Date of Patent: Apr. 12, 2011

(54) HAPTIC MODULE USING MAGNETIC FORCE, ELECTRONIC APPARATUSES HAVING THE MODULE

(75) Inventors: Nam-Su Yuk, Daegu (KR); Tae-Heon Yang, Yeongi-gun (KR); Dong-Soo Kwon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 344 days.

(21) Appl. No.: 12/292,028

(22) Filed: Nov. 10, 2008

(65) Prior Publication Data

US 2009/0121848 A1    May 14, 2009

(30) Foreign Application Priority Data

Nov. 12, 2007  (KR) .................. 10-2007-0114621

(51) Int. Cl.
*H04B 3/36*    (2006.01)
*H03M 1/22*    (2006.01)
*G06F 3/041*    (2006.01)

(52) U.S. Cl. .................... 340/407.2; 340/407.1; 341/32; 345/156; 345/173; 434/113

(58) Field of Classification Search .............. 340/407.2; 341/32
See application file for complete search history.

(56) References Cited

U.S. PATENT DOCUMENTS

| | | | |
|---|---|---|---|
| 7,245,048 B2 * | 7/2007 | Fujii et al. | 310/12.01 |
| 7,525,415 B2 * | 4/2009 | Yatsu et al. | 340/407.2 |
| 2006/0012576 A1 * | 1/2006 | Hafez et al. | 345/173 |

* cited by examiner

*Primary Examiner* — Donnie L Crosland
(74) *Attorney, Agent, or Firm* — The Nath Law Group; Jerald L. Meyer; Derek Richmond (57) ABSTRACT

A haptic module using a magnetic force and an electronic apparatuses having a magnet arrangement frame arranged so that polarities of adjacent magnets are alternate; shielding screens positioned on uppers of each of frame elements of the magnet arrangement frame and formed in a window arrangement to shield any one polarity of the frame elements; linear movement apparatus fixed to outside portions of the shielding screens to move the shielding screens in a longitudinal direction of the frame element; a magnet frame positioned on an upper of the magnet arrangement frame through the shielding screen and taking on the same polarity on the whole of one surface thereof; and a controller that controls the linear movement apparatus to provide various and dynamic force feedback and tactile sensation to a user, as well as reduce complexity of a constitution as compared to a related art and further accomplish miniaturization.

12 Claims, 14 Drawing Sheets

HAPTIC MODULE USING MAGNETIC FORCE, ELECTRONIC APPARATUSES HAVING THE MODULE

This application claims priority to Korean Patent Application No. 2007-0114621, filed on Nov. 12, 2007, in the Korean Intellectual Property Office, the entire contents of which are hereby incorporated by reference.

BACKGROUND OF THE INVENTION

1. Field of the Invention

The present invention relates to haptic technology feeding back force feedback and tactile sensation to a user, and more specifically to a haptic module providing force feedback and tactile sensation against force applied to a touch panel (for example, a touch window) by a user through adjustment of a magnetic force, and electronic apparatuses having the module.

2. Description of the Related Art

A haptic interface indicates an entire system implementing a virtual reality and a tactile interaction in a broad sense, however, indicates a physical device for transmitting tactile sensation to humans in a narrow sense, and is usually referred to as a haptic device.

In order to transmit information, a transmission medium is required between humans and media, which may be defined as a term 'interface'. The media and the interface are inseparably related, and the interface has no choice but to have a form relying on the five senses of the human. Recently, due to development of engineering technology, interface-related technology relying on only the visual and auditory senses has continuously been evolved into technology utilizing olfactory sense and tactile sense. That is, the haptic device has been spotlighted as a device for media related to the tactile sensation.

As well known, the haptic device is divided into a force feedback device that transmits a physical force to a muscle or a joint, etc., and a tactile device that transmits skin stimulus such as vibration, as well as pressure, temperature, texture, and ache.

The key point of the tactile device is to be equipped with tactile technology implementing a realistic force such as texture of a real material to a user through the skin stimulus as described above.

One example of the tactile device is disclosed in U.S Laid-Open Patent Application No. 2006-0012576 A1 (hereinafter, referred to as '576 patent). A touch display device disclosed in the '576 patent is constituted by a touch plate, a plurality of tactile sensation modification components operably mounted on the touch plate and having magnetism, and a plurality of coils. The tactile sensation modification components are vibrated according to a direction of current applied to the coils, and a hand or a finger of a user is stimulated by vibration of the touch plate. Accordingly, the user may feel tactile sensation of a material displayed on a screen.

However, the above-mentioned '576 patent has disadvantages that components are complex, as well as miniaturization is limited because an occupying area of an electromagnetic device mounted on a lower surface of the coil and a blade is wide. Furthermore, since it implements only a tactile sensation function, it is impossible to provide more dynamic feel by force feedback to the user.

SUMMARY OF THE INVENTION

The present invention has been proposed to solve the problems. It is an object of the present invention to provide a haptic module capable of dynamically providing tactile sensation and force feedback, and electronic apparatuses having the module.

Also, it is another object of the present invention to provide a haptic module capable of reducing complexity of a constitution as compared to a related art and accomplishing miniaturization, and electronic apparatuses having the module.

A haptic module according to one aspect of the present invention comprises: a magnet arrangement frame arranged so that polarities of adjacent magnets are alternate; shielding screens positioned on uppers of each of frame elements of the magnet arrangement frame and formed in a window arrangement to shield any one polarity of the frame elements; linear movement means fixed to outside portions of the shielding screens to move the shielding screens in a longitudinal direction of the frame element; a magnet frame positioned on an upper of the magnet arrangement frame through the shielding screen and taking on the same polarity on the whole of one surface thereof; and a controller that controls the linear movement means.

Preferably, the linear movement means includes a stator, a fixing bar to which the stator is vertically fixed at one end thereof, and a mover slidably mounted on the other end portion of the fixing bar and provided with a slit which is formed at an outer circumference thereof for inserting and fixing a side portion of the shielding screen.

The controller according to a feature of one aspect limits a movement distance of the shielding screen to a size of the window through the linear movement means. Also, the controller controls the linear movement means so that the frame element simultaneously takes on N polarity and S polarity, thereby making it possible to move the shielding screen.

According to the present invention, it is possible to provide various and dynamic force feedback and tactile sensation to a user. Also, it is possible to reduce complexity of a constitution as compared to a related art and further accomplish miniaturization.

BRIEF DESCRIPTION OF THE DRAWINGS

These and other objects, features, and advantages of preferred embodiments of the present invention will be more fully described in the following detailed description, taken in conjunction with the accompanying drawings. In the drawings.

DETAILED DESCRIPTION OF THE INVENTION

Specific features and benefits of the present invention will further be obvious by the following detailed description with reference to accompanying drawings. It should be noted that in the case where it is judged that a specific description for a known function with respect to the present invention and a configuration thereof may unnecessarily obscure the gist of the present invention, it will be omitted.

Figure 1:
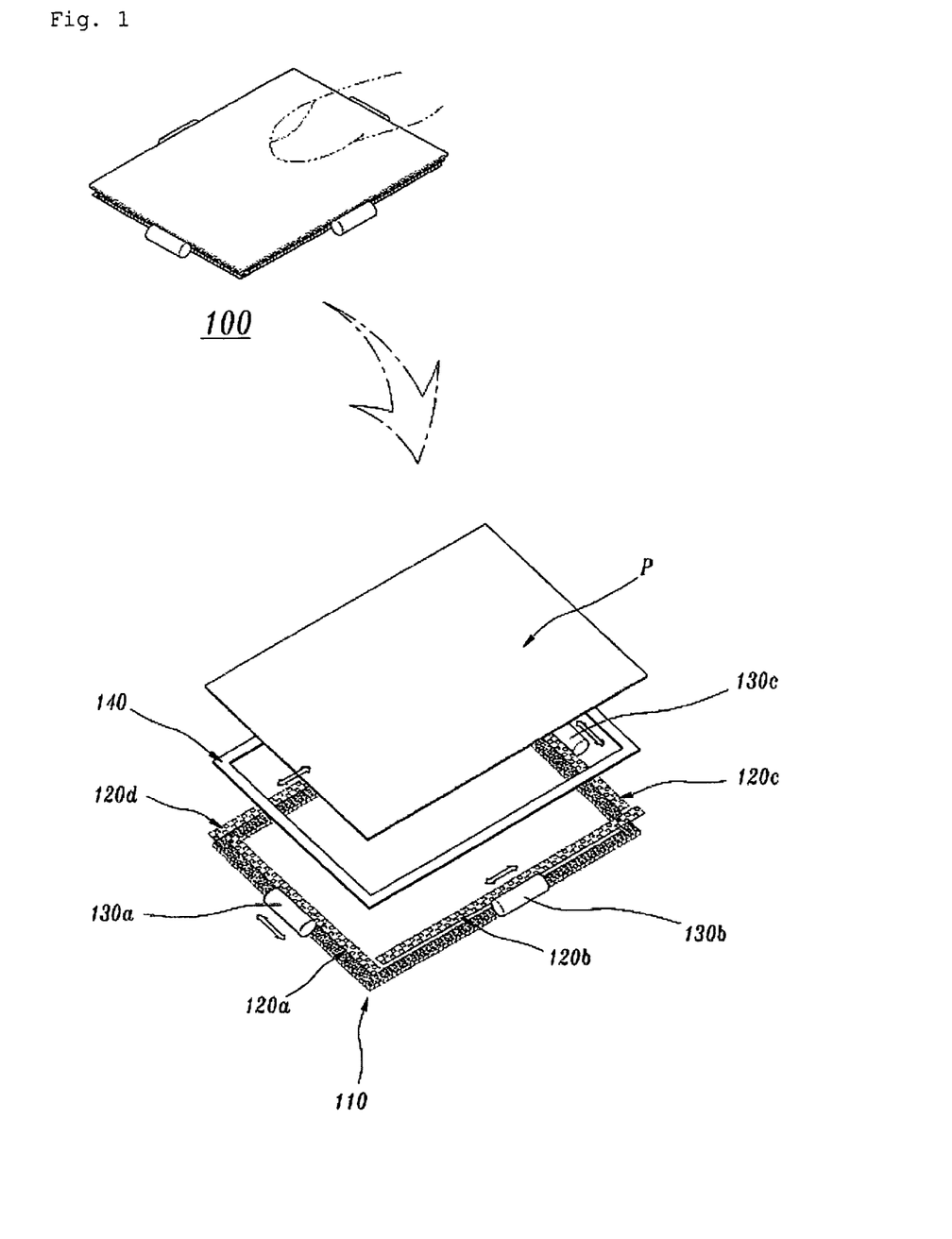
FIG. 1 is a schematic view showing the configuration of a haptic module using a magnetic force according to a preferable embodiment of the present invention.

FIG. 1 is a schematic view showing the configuration of a haptic module using a magnetic force according to a preferable embodiment of the present invention. As shown in FIG. 1, the haptic module 100 includes a magnet arrangement frame 110, shielding screens 120*a*, 120*b*, 120*c*, and 120*d* moving in a longitudinal direction on uppers of each element of the magnet arrangement frame, linear movement means 130*a*, 130*b*, 130*c*, and 130*d* moving the shield screens, a magnet frame 140 positioned on an upper of the magnet arrangement frame through the shielding screen, and a controller (not shown) 150 controlling movement of the linear movement means.

Figure 2:
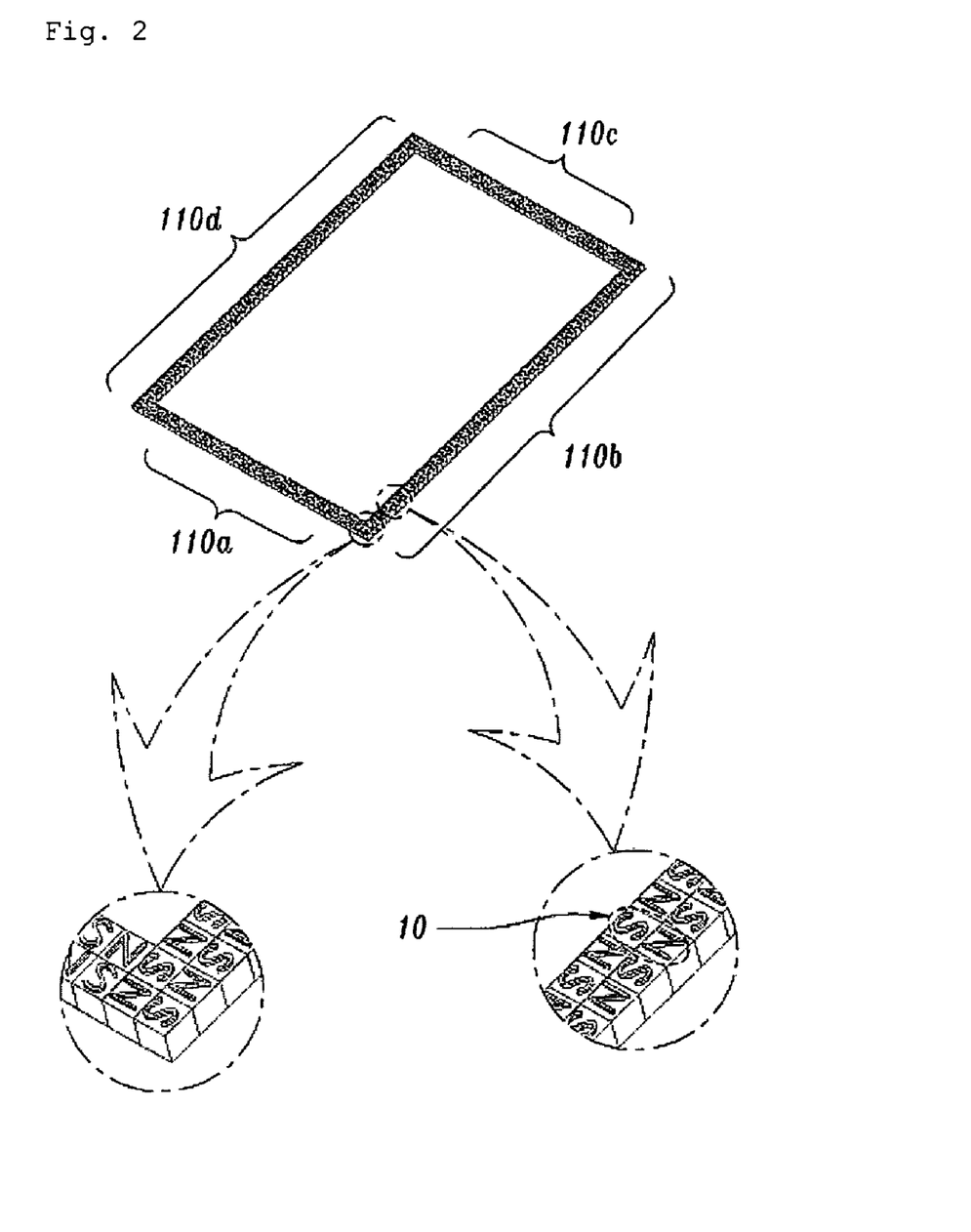
FIG. 2 is a detailed view showing the configuration of a magnet arrangement frame of FIG. 1.

Specifically, the magnet arrangement frame 110 is constituted by four frame elements 110*a*, 110*b*, 110*c*, and 110*d*, as shown in FIG. 2. In the magnet arrangement frame 110, magnets of an N pole and an S pole are alternately disposed with respect to the whole of the frame. In this embodiment, a magnet element 10 constituted by one N pole and one S pole as shown in FIG. 2. That is, the magnet arrangement frame 110 is arranged with a plurality of magnet elements 10, wherein adjacent magnet elements are arranged to have an inverse polarity. Such an arrangement form is equally applied to four corners of the magnet arrangement frame 110.

Figure 3:
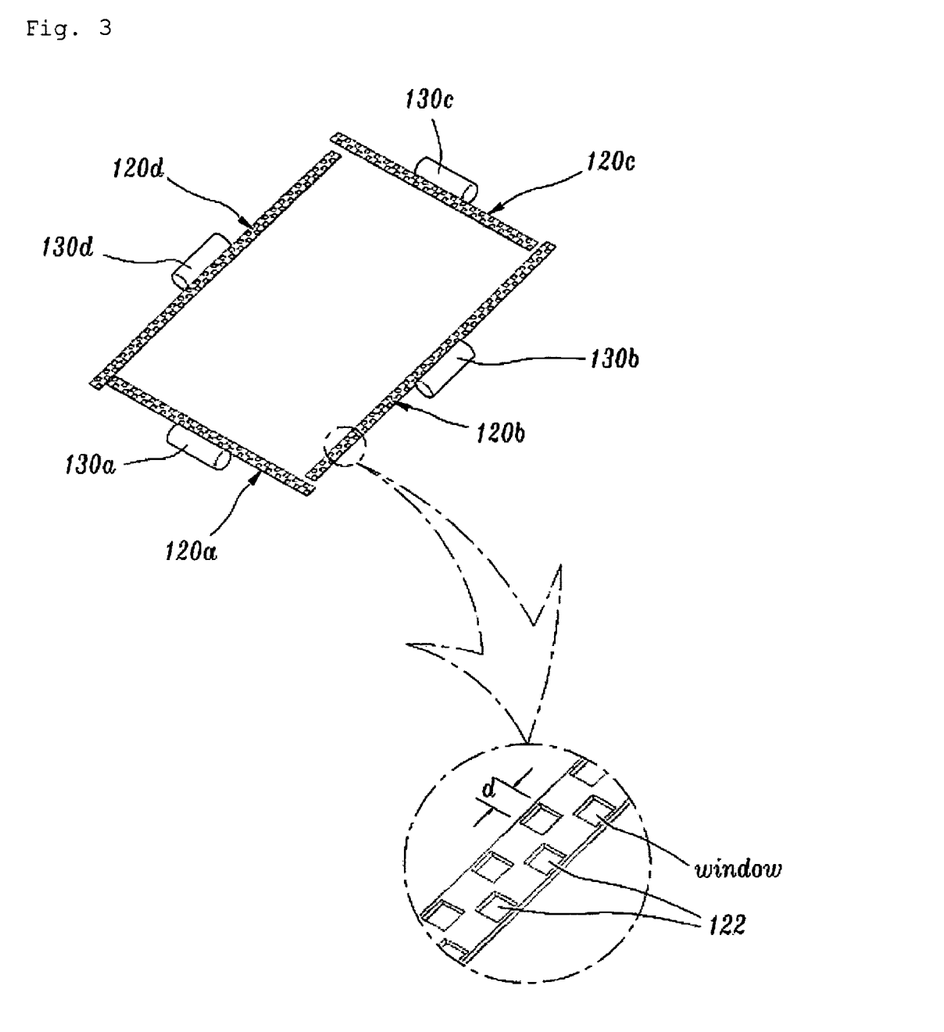
FIG. 3 is a detailed view showing the configuration of a shielding screen of FIG. 1.

Referring to FIG. 3, the shielding screens 120*a*, 120*b*, 120*c*, and 120*d* are positioned on the uppers of each element 110*a*, 110*b*, 110*c*, and 110*d* of the magnet arrangement frame 110 to shield any one polarity of the magnet element through the movement in the longitudinal direction of the frame element, as described above. The shield screen is formed in an arrangement constituted of a plurality of open windows 122 (hereinafter, 'a window arrangement') for such a shielding. A specific description with respect to shielding operation will be described below.

The 'movement in the longitudinal direction' is accomplished by the linear movement means 130*a*, 130*b*, 130*c*, and 130*d* fixed to each of outside portions of the shielding screens. The linear movement means 130*a*, 130*b*, 130*c*, and 130*d* may be implemented as a mechanical configuration. In this embodiment, as an example considered to be most suitable for the linear movement means by the present inventor, 'a linear actuator' is suggested.

Figure 4:
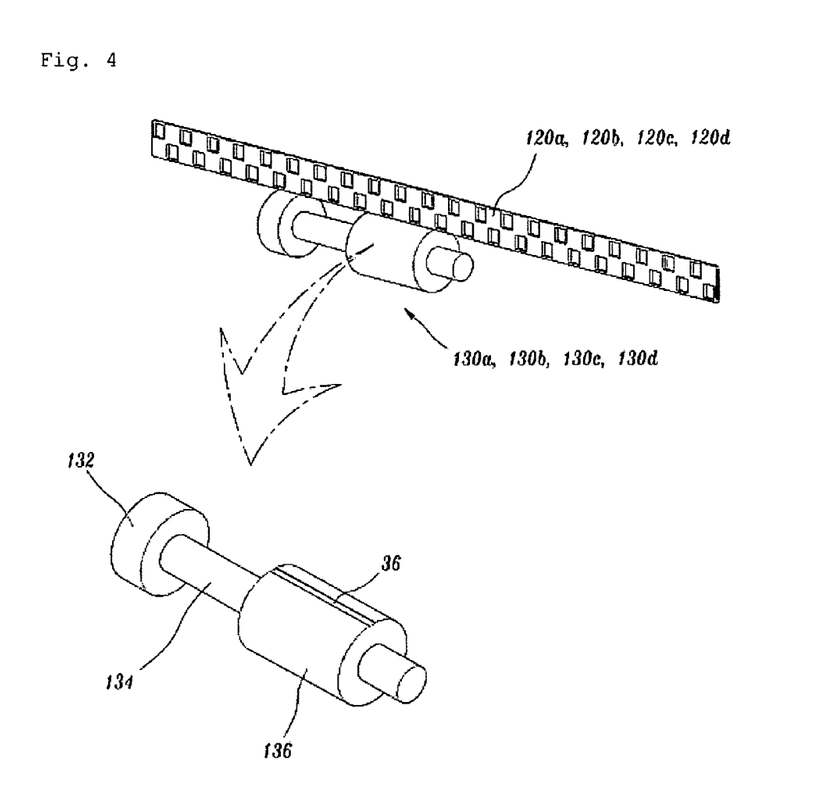
FIG. 4 is an exemplary view of a linear movement means of FIG. 3.
Figure 5:
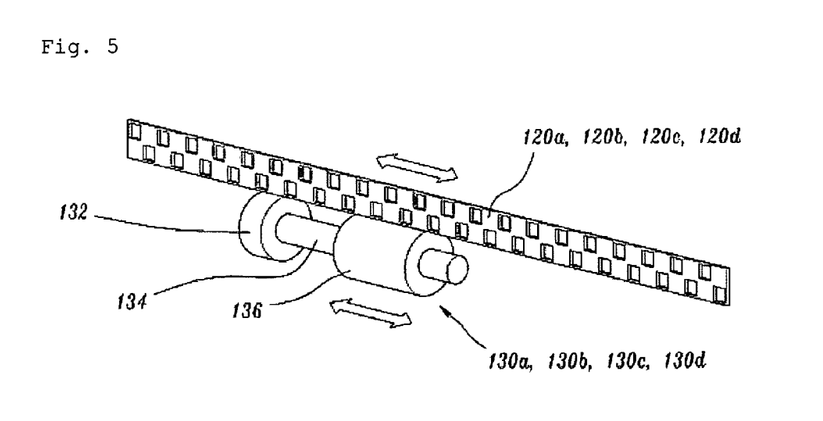
FIG. 5 is an exemplary view showing a linear movement of the shielding screen according to the linear movement means of FIG. 3.

FIG. 4 shows the linear movement means set to the 'linear actuator'. Specifically, the linear movement means includes a stator 132, a fixing bar 134 to which the stator 132 is vertically fixed at one end thereof, and a cylindrical mover 136 slidably mounted on the other end portion of the fixing bar 134. The mover 136 is provided with a slit 36 which is formed at an outer circumference thereof for inserting and fixing a side portion of the shielding screen. The linear movement means having the above-mentioned configuration may linearly move the shielding screen in the longitudinal direction of the frame element (see FIG. 5). For reference, a movement distance of the shielding screen is preferably limited to a size (as indicated by numeral 'd' in FIG. 3) of the window.

Figure 6:
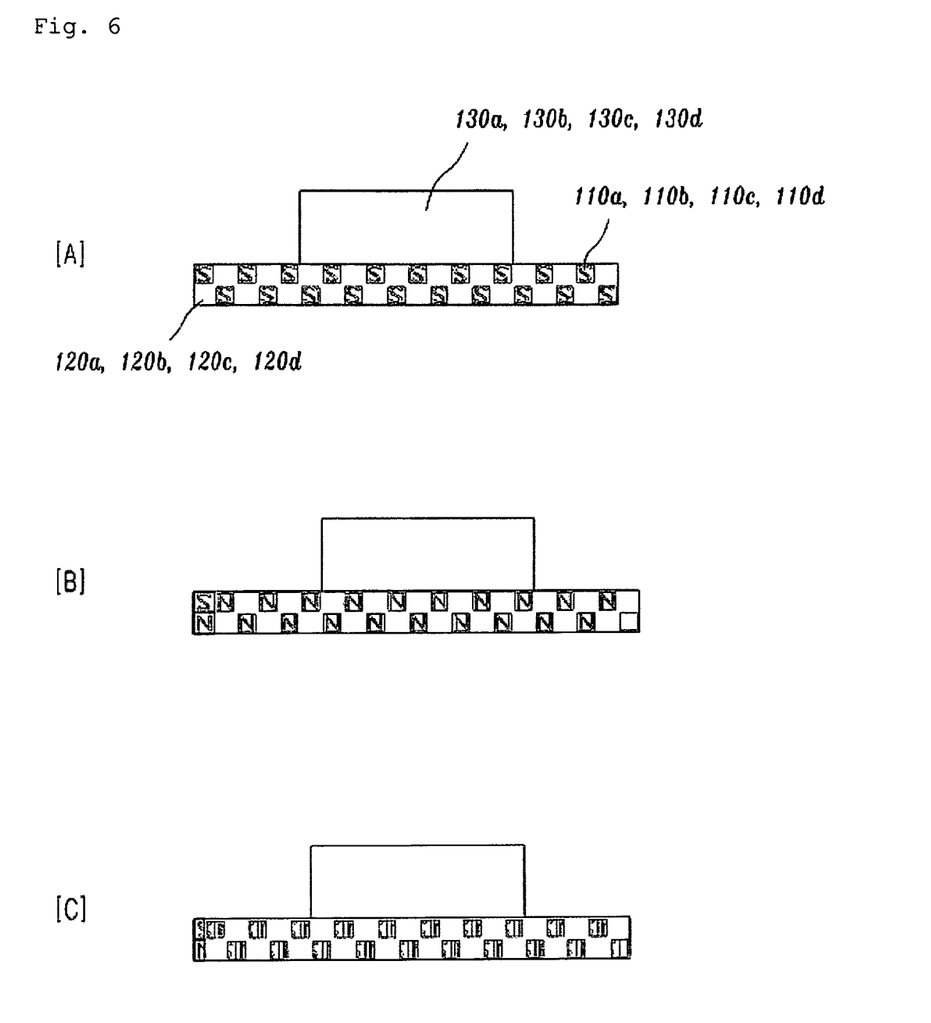
FIG. 6 is an exemplary view showing a selective shielding operation of the shielding screen of FIG. 3.

Meanwhile, it is possible to selectively shield the polarity of the magnet elements according to the movement distance of the shielding screen driven by the linear movement means. Such an operation may be represented as a screen operation, which may be divided into an operation [A] in a case of shielding the N pole, an operation [B] in a case of shielding the S pole, and an operation [C] in a case of shielding only a portion of the N pole and the S pole, as shown in FIG. 6. That is, the shielding screen may selectively flexibly shield the polarity for each frame element of the magnet arrangement frame 110.

Figure 7:
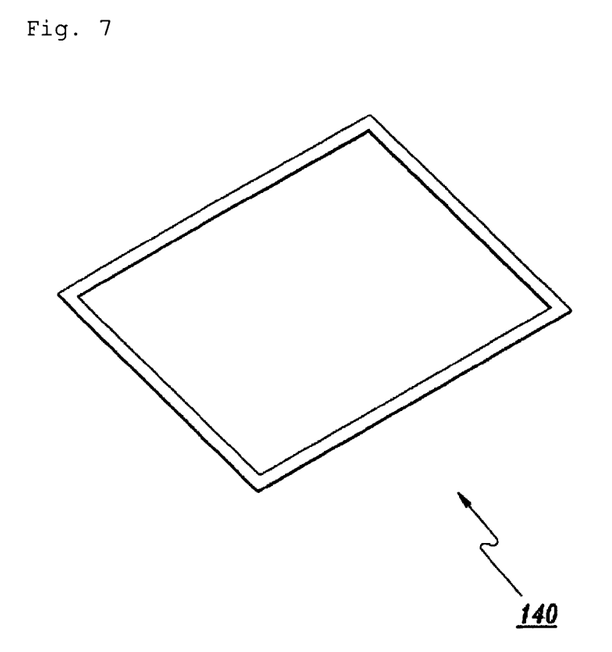
FIG. 7 is a detailed view showing the configuration of a magnet frame of FIG. 1.

FIG. 7 shows the magnet frame 140 of this embodiment. The magnet frame 140 is disposed on the upper of the magnet arrangement frame through the shielding screen as described above with reference to FIG. 1. Although this magnet frame 140 is named similarly to the above-mentioned magnet arrangement frame 110, it is not constituted to have the polarity alternated by the magnet elements 110*a*, 110*b*, 110*c*, and 110*d* but is constituted to have the same polarity in the whole of one surface. That is, if one surface of the magnet frame has S polarity, the other surface thereof has N polarity.

Figure 8:
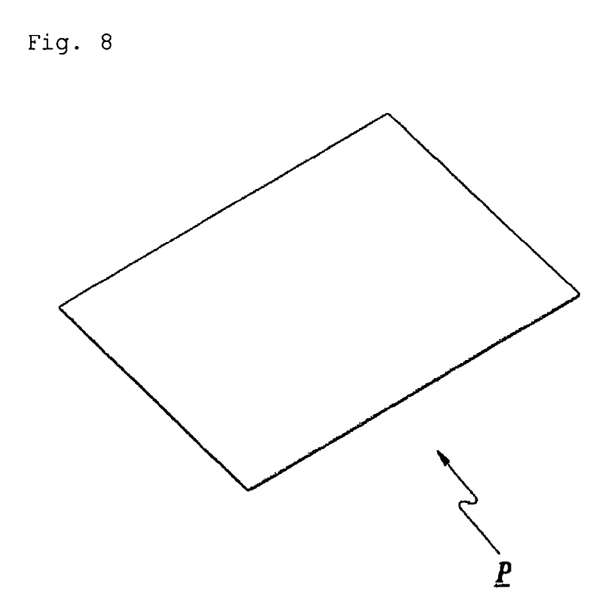
FIG. 8 is a detailed view showing the configuration of a touch panel of FIG. 1.

A touch panel P shown in FIG. 8 is a component included in an electronic apparatus, for example, a cell phone, a portable game device, a PDA, etc., having the haptic module 100 according to this embodiment. This touch panel P is fixed to an upper of the above-mentioned magnet frame 140 to be freely and variously floated by a magnetic force of the magnet arrangement frame 110. The touch panel P of this embodiment may be a touch window or a panel with a plurality of physical buttons.

Figure 9:
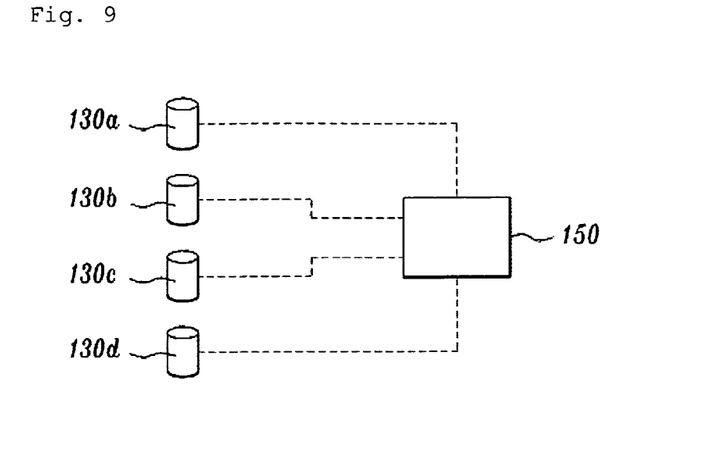
FIG. 9 is a schematic configuration view showing a controller according to a preferable embodiment of the present invention.

Meanwhile, the controller 150 controls the movement of the shielding screens 120*a*, 120*b*, 120*c*, and 120*d*. Specifically viewing FIG. 9, it controls the linear movement of the shielding screen by driving the linear movement means 130*a*, 130*b*, 130*c*, and 130*d* provided in each of the above-mentioned shielding screens.

Hereinafter, how force feedback and tactile sensation are provided to a user according to the control of the controller 150 will be described, which is an object of the present invention. Before description, assume that a lower surface of the magnet frame attached to the touch panel 150 takes on the N polarity.

Figure 10:
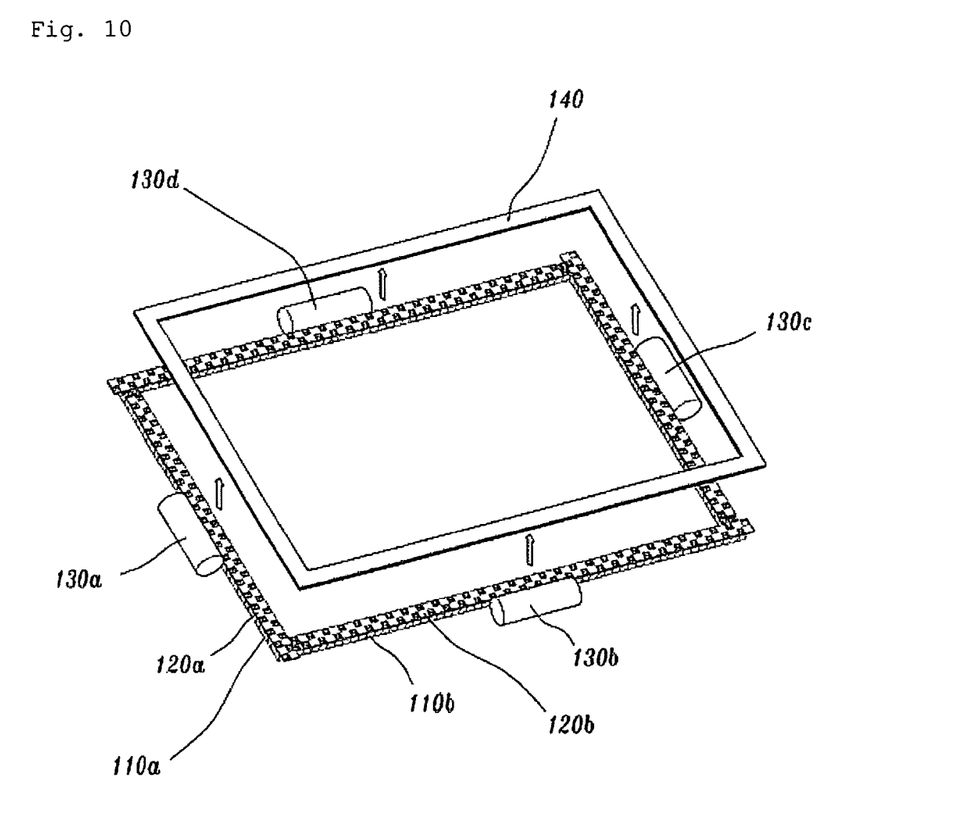
FIGS. 10 to 16 are exemplary views showing inclination of the magnet frame according to the controller of FIG. 9.
Figure 11:
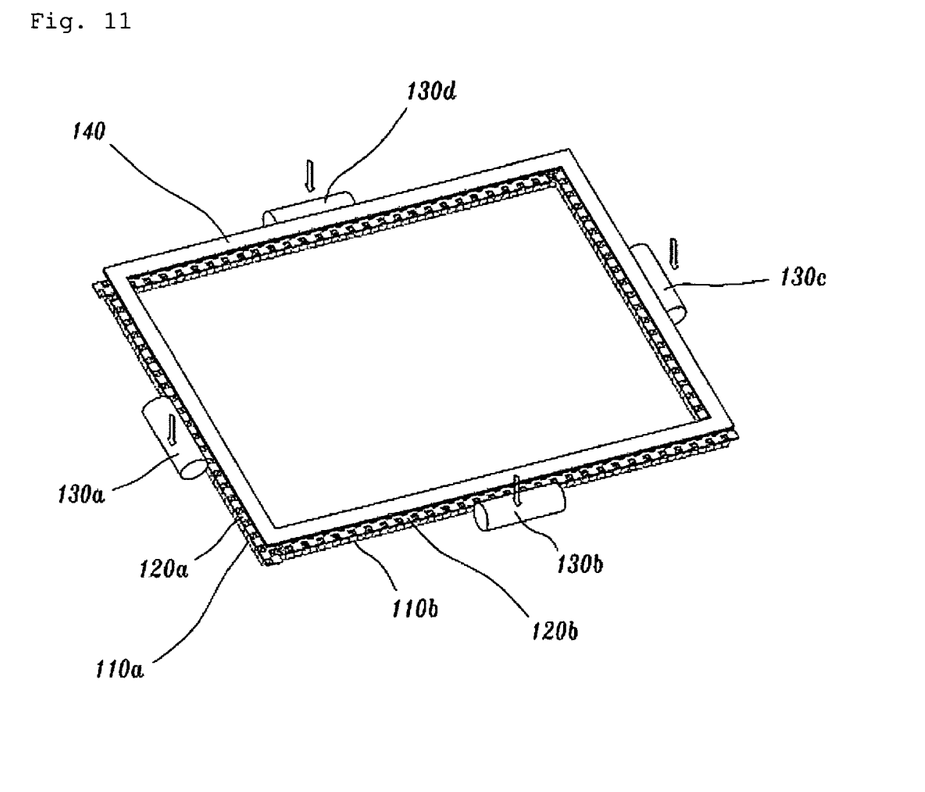

First, when the controller 150 drives the linear movement means 130*a*, 130*b*, 130*c*, and 130*d*, so that four shielding screens shield the frame elements 110*a*, 110*b*, 110*c*, and 110*d* of the magnet arrangement frame 110 to allow all of them to take on the N polarity, the magnet frame 140 taking on the N polarity is pushed up, as shown in FIG. 10. On the other hand, when the controller 150 drives the linear movement means so that four shielding screens shield the frame elements to allow all of them to take on the S polarity, the magnet frame 140 taking on the N polarity is pulled down, as shown in FIG. 11. That is, when the controller 150 is repetitively controlled in states in FIGS. 10 and 11, it is possible to provide vibration in a vertical direction or the feeling of pressing a physical button to the user operating the touch panel P.

Figure 12:
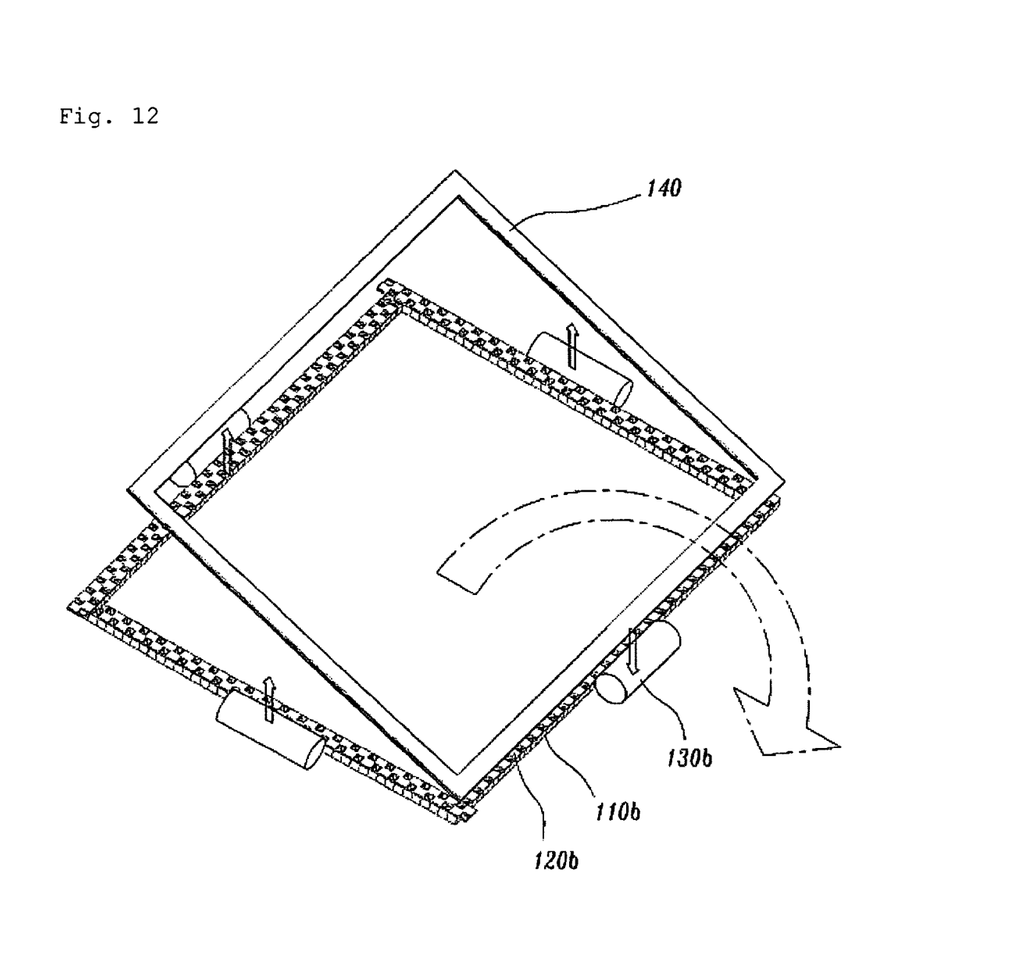
Figure 13:
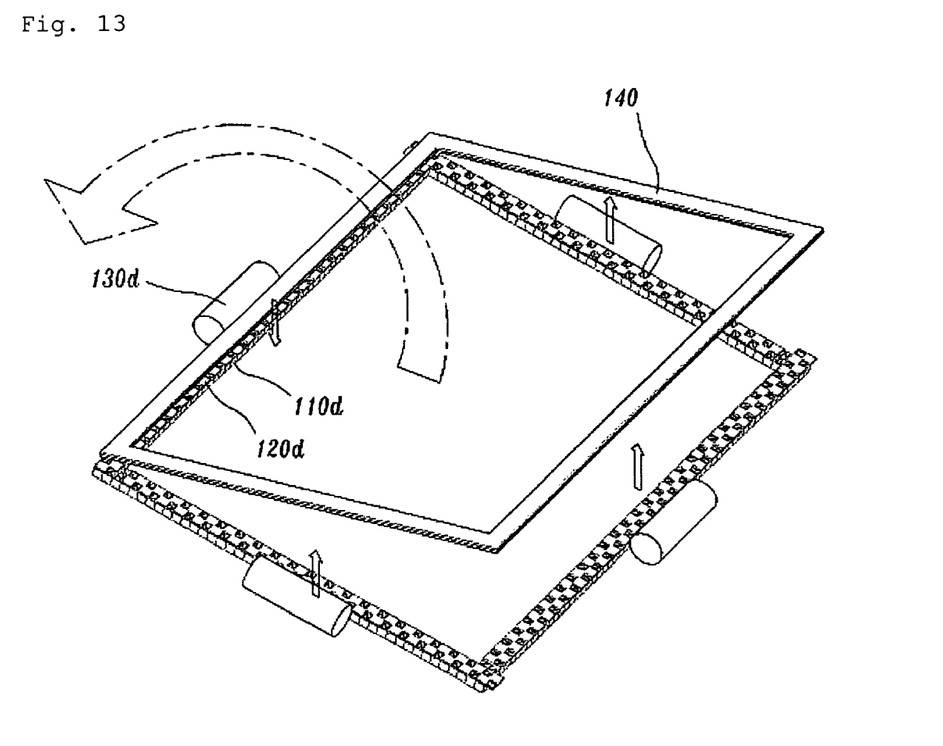

Meanwhile, when the controller 150 drives the linear movement means so that any one of the frame elements of the magnet arrangement frame 110 takes on the S polarity, the magnet frame 140 inclines toward any one of the frame elements. For example, when the N pole of the frame element 110*b* is shielded, the magnet frame 140 inclines toward the frame element 110*b*, as shown in FIG. 12, and when the N pole of the frame element 110*d* is shielded, the magnet frame 140 inclines toward the frame element 110*d*, as shown in FIG.

13. It is possible to incline the magnet frame 140 toward any one direction of up and down and right and left through such a control scheme. And, when a procedure converting the polarity of the inclined frame element into the N polarity and at the same time, converting the polarity of an opposite frame element into the S polarity is repetitively controlled, it is possible to provide vibration in an up and down direction or right and left direction, unlike the vibration in the vertical direction as described above.

Figure 14:
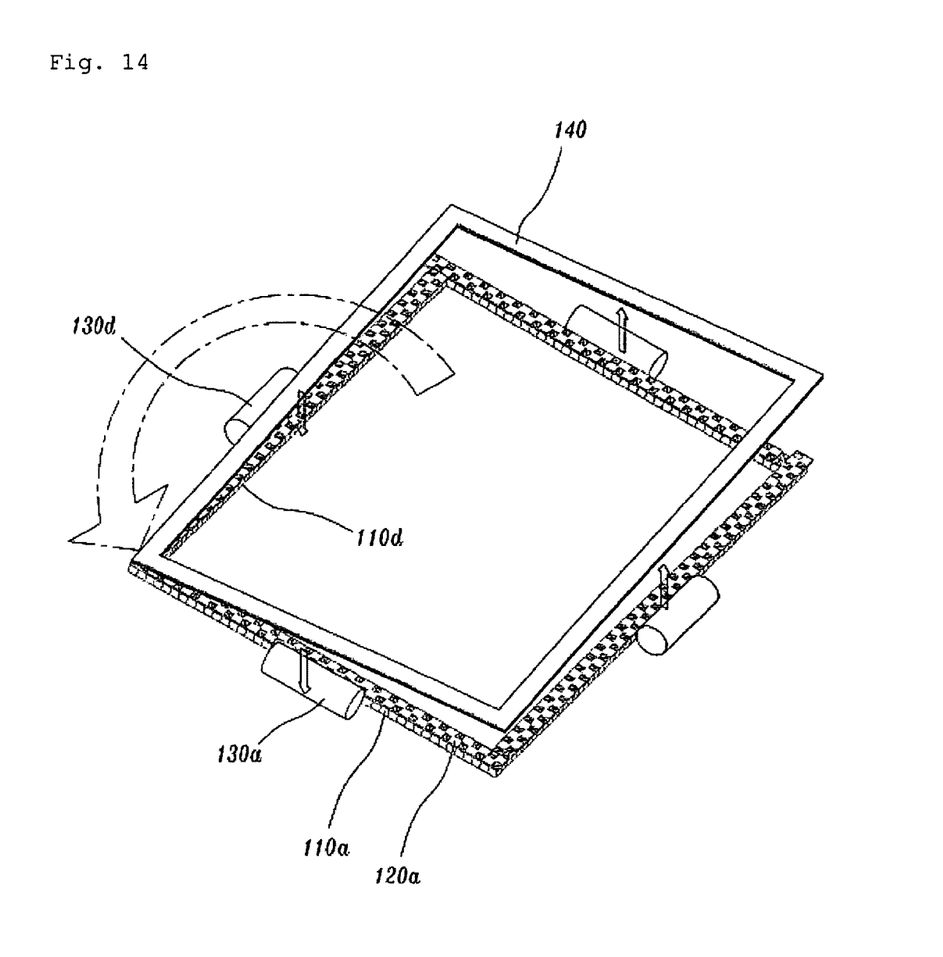
Figure 15:
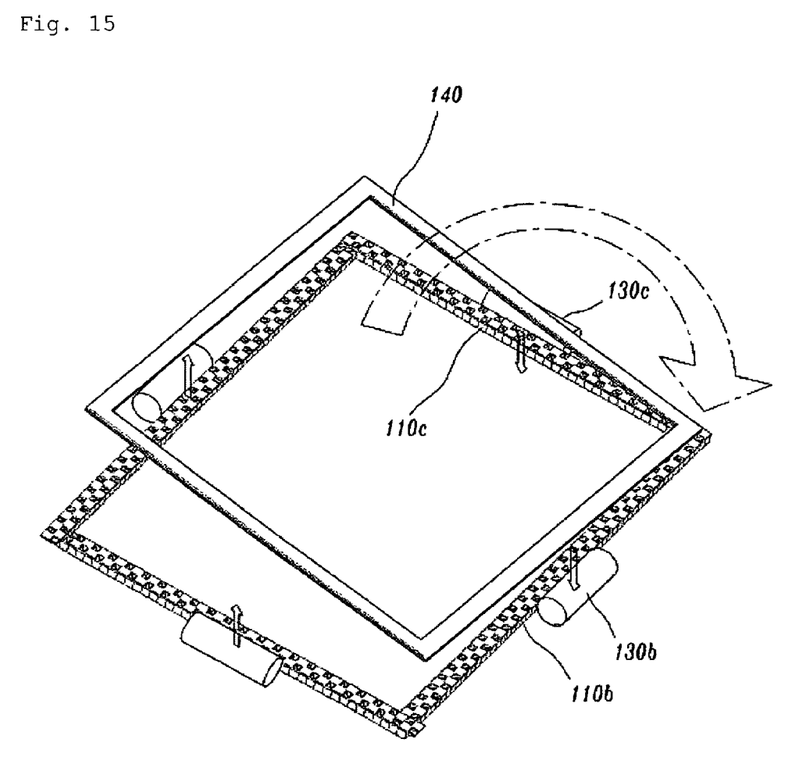

Also, this embodiment is not limited only to the above-mentioned inclination type and vibration type. For example, when the frame elements 110a and 110d of the magnet arrangement frame 110 are shielded to take on the S polarity, the magnet frame 140 inclines toward a direction in which the frame elements 110a and 110d are contacted to each other, in other words, a diagonal direction, as shown in FIG. 14. Similarly, when the frame elements 110b and 110c are shielded to take on the S polarity, the magnet frame 140 inclines toward a direction in which the frame elements 110b and 110c are contacted to each other (see FIG. 15). Of course, when such an inclination in the diagonal direction is repetitively controlled, it is possible to implement vibration in the diagonal direction.

Figure 16:
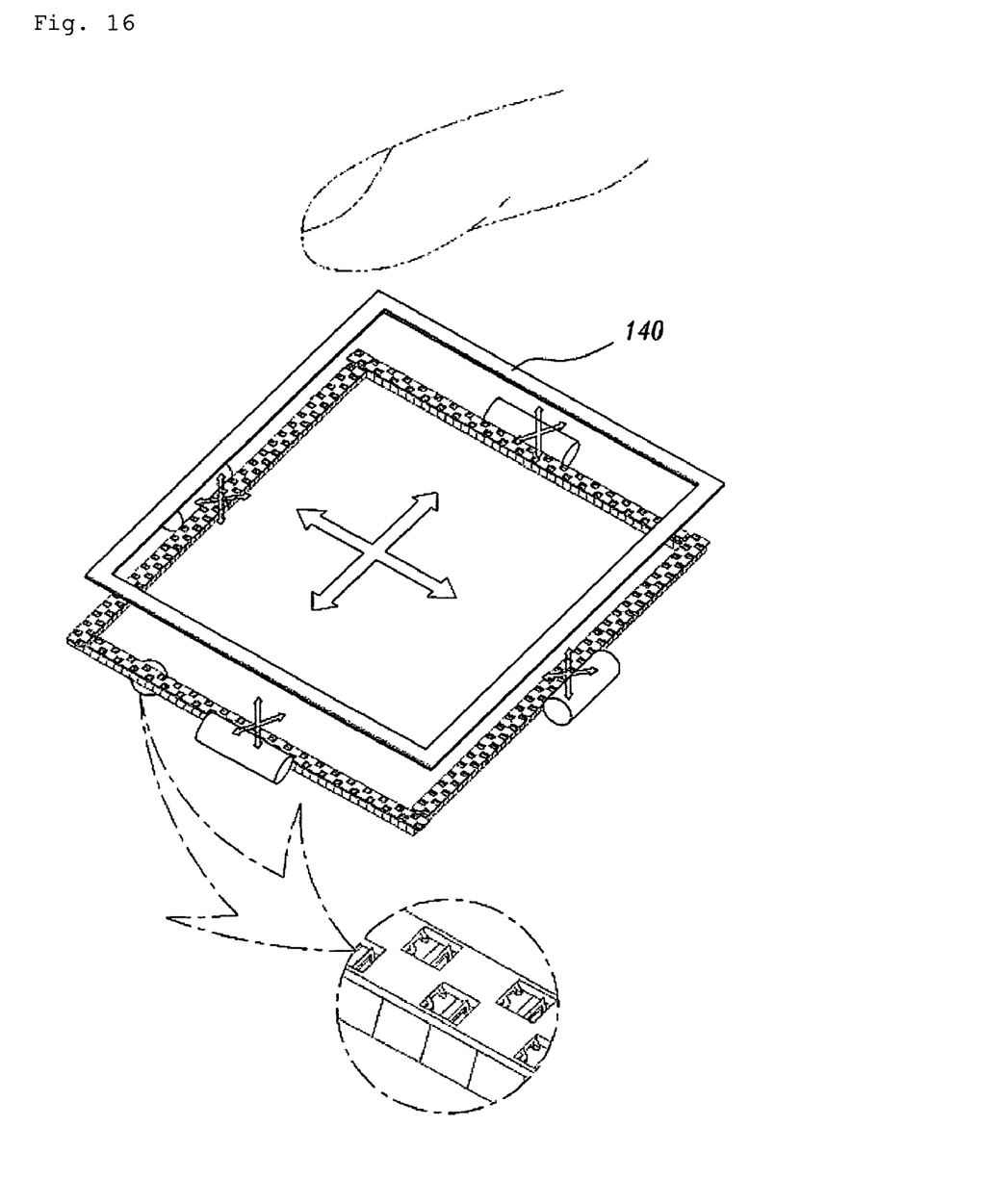

Also, as shown in FIG. 16, when the user rubs the touch panel with his/her hand or finger in an up and down or right and left direction in a state where all of the frame elements of the magnet arrangement frame 110 simultaneously have the N pole and the S pole and the ratio of the N pole and the S pole is adjusted, it is also possible to provide tactile sensation as if he/she touches a rough surface, for example, slipperiness, stiffness, etc.

As such, the controller 150 controls the linear movement of the shielding screen 120a, 120b, 120c, and 120d through the linear movement means 130a, 130b, 130c, and 130d, thereby making it possible to provide very various and free motion as well as dynamic force feedback and tactile sensation.

As described above, the haptic module 100 of the present invention is considerably reduced in complexity of constitution as compared to the above-mentioned related device (the touch display device in '576 patent) to further accomplish miniaturization. Therefore, it may easily be adopted in a small electronic apparatus such as a cell phone, a portable game device, a PDA, etc.

Figure 17:
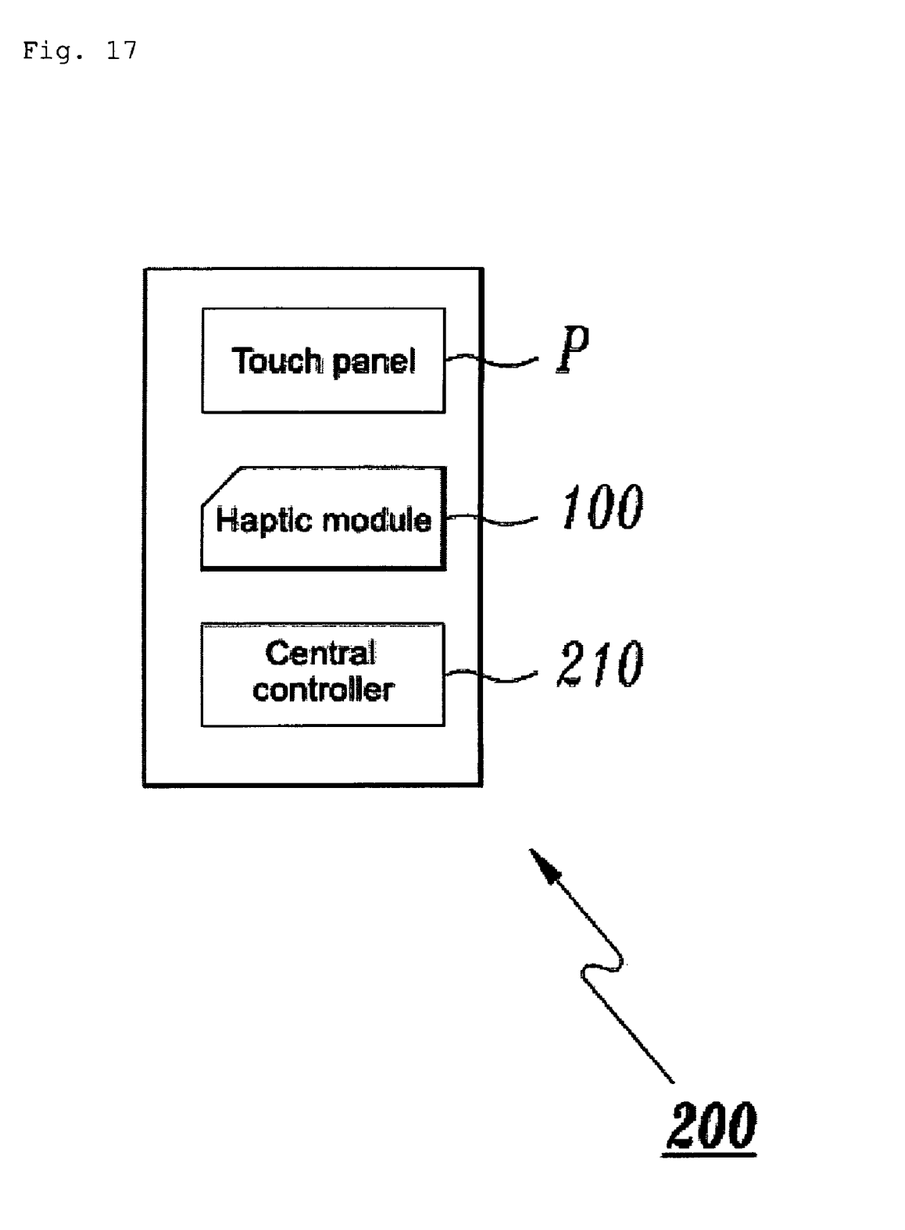
FIG. 17 is a schematic view showing the configuration of an electronic apparatus having the haptic module of the present invention.

FIG. 17 shows an electronic apparatus 200 having the above-mentioned haptic module 100. The electronic apparatus 200 is a device including the touch panel P as described above. Herein, the controller 150 of the haptic module 100 is dependent on a central controller 210 of the electronic apparatus 200 or the central controller may be modified and implemented to be wholly responsible for a function of the controller 150.

Although the present invention has been described in detail with reference to its presently preferred embodiment, it will be understood by those skilled in the art that various modifications and equivalents can be made without departing from the spirit and scope of the present invention, as set forth in the appended claims.

What is claimed is:

1. A haptic module using a magnetic force comprising:
a magnet arrangement frame arranged so that polarities of adjacent magnets are alternate;
shielding screens positioned on uppers of each of frame elements of the magnet arrangement frame and formed in a window arrangement to shield any one polarity of the frame elements;
linear movement means fixed to outside portions of the shielding screens to move the shielding screens in a longitudinal direction of the frame element;
a magnet frame positioned on an upper of the magnet arrangement frame through the shielding screen and taking on the same polarity on the whole of one surface thereof; and
a controller that controls the linear movement means.

2. The haptic module using the magnetic force according to claim 1, wherein the linear movement means includes a stator, a fixing bar to which the stator is vertically fixed at one end thereof, and a mover slidably mounted on the other end portion of the fixing bar and provided with a slit which is formed at an outer circumference thereof for inserting and fixing a side portion of the shielding screen.

3. The haptic module using the magnetic force according to claim 1, wherein the controller limits a movement distance of the shielding screen to a size of the window through the linear movement means.

4. The haptic module using the magnetic force according to claim 1, wherein the controller controls the linear movement means so that the frame element simultaneously takes on N polarity and S polarity, thereby moving the shielding screen.

5. An electronic apparatus having a touch panel comprising:
a haptic module includes:
a magnet arrangement frame arranged so that polarities of adjacent magnets are alternate;
shielding screens positioned on uppers of each of frame elements of the magnet arrangement frame and formed in a window arrangement to shield any one polarity of the frame elements;
linear movement means fixed to outside portions of the shielding screens to move the shielding screens in a longitudinal direction of the frame element;
a magnet frame having the touch panel attached to an upper thereof, positioned on an upper of the magnet arrangement frame through the shielding screen, and taking on the same polarity on the whole of one surface thereof; and
a controller that controls the linear movement means.

6. The electronic apparatus according to claim 5, wherein the linear movement means includes a stator, a fixing bar to which the stator is vertically fixed at one end thereof, and a mover slidably mounted on the other end portion of the fixing bar and provided with a slit which is formed at an outer circumference thereof for inserting and fixing a side portion of the shielding screen.

7. The electronic apparatus according to claim 5, wherein the controller limits a movement distance of the shielding screen to a size of the window through the linear movement means.

8. The electronic apparatus according to claim 5, wherein the controller controls the linear movement means so that the frame element simultaneously takes on N polarity and S polarity, thereby moving the shielding screen.

9. An electronic apparatus having a touch panel comprising:
a haptic module includes:
a magnet arrangement frame arranged so that polarities of adjacent magnets are alternate;
shielding screens positioned on uppers of each of frame elements of the magnet arrangement frame and formed in a window arrangement to shield any one polarity of the frame elements;

linear movement means fixed to outside portions of the shielding screens to move the shielding screens in a longitudinal direction of the frame element; and a magnet frame having the touch panel attached to an upper thereof, positioned on an upper of the magnet arrangement frame through the shielding screen, and taking on the same polarity on the whole of one surface thereof;

wherein the linear movement means is controlled by a central controller of the electronic apparatus.

10. The electronic apparatus according to claim 9, wherein the linear movement means includes a stator, a fixing bar to which the stator is vertically fixed at one end thereof, and a mover slidably mounted on the other end portion of the fixing bar and provided with a slit which is formed at an outer circumference thereof for inserting and fixing a side portion of the shielding screen.

11. The electronic apparatus according to claim 9, wherein the central controller limits a movement distance of the shielding screen to a size of the window through the linear movement means.

12. The electronic apparatus according to claim 9, wherein the central controller controls the linear movement means so that the frame element simultaneously takes on N polarity and S polarity, thereby moving the shielding screen.

* * * * *